United States Patent [19]

LaValley

[11] Patent Number: 4,795,558

[45] Date of Patent: Jan. 3, 1989

[54] SHOWER PIPES FOR ROTARY DRUM FILTER

[75] Inventor: Richard W. LaValley, Vancouver, Wash.

[73] Assignee: LaValley Industrial Plastics, Inc., Vancouver, Wash.

[21] Appl. No.: 80,252

[22] Filed: Jul. 17, 1987

Related U.S. Application Data

[63] Continuation of Ser. No. 709,450, Mar. 8, 1985, abandoned, which is a continuation-in-part of Ser. No. 464,023, Feb. 4, 1983, Pat. No. 4,522,716.

[51] Int. Cl.$^4$ .............................................. B01D 33/38
[52] U.S. Cl. ................... 210/217; 210/394; 210/409; 210/402; 439/523; 439/556; 138/174
[58] Field of Search ............... 210/784, 210, 211, 213, 210/217, 336, 394, 402, 403, 404, 411, 412; 8/156, 158; 138/37, 89, 94, 172, 174, 119, 157.02; 239/521, 523, 548, 556; 68/175, 200, 202, 204, 205 R

[56] References Cited

U.S. PATENT DOCUMENTS

| 2,673,763 | 3/1954 | Dunn | 239/521 |
| 2,826,248 | 3/1958 | Angel | 158/99 |
| 3,080,124 | 3/1963 | Rathmann | 239/450 |
| 4,130,247 | 12/1978 | Healy | 239/523 |
| 4,168,033 | 9/1979 | von Bernutt et al. | 239/523 |

Primary Examiner—Richard V. Fisher
Assistant Examiner—Wanda L. Millard
Attorney, Agent, or Firm—Marger & Johnson

[57] ABSTRACT

A shower pipe for a rotary drum filter includes first and second parallel rows of spray holes which extend along the length of the pipe. The holes in one row are staggered with respect to the holes in the other row, with both rows being positioned circumferentially in the same quadrant of the pipe. Each spray hole has its own separate fan-shaped diffusion flange extending in a generally parabolic curve from the adjacent hole. Each spray hole may be formed by a premolded plastic sleeve-like insert which is inserted through and seated within prebored holes in a section of the pipe. Each insert defines a spray hole or nozzle for discharging liquid under pressure from the pipe onto its associated diffusion flange. Each diffusion flange member may be premolded to include a female threaded upper portion which threads onto a male threaded projectng portion of the insert extending from the outer wall of the pipe.

30 Claims, 2 Drawing Sheets

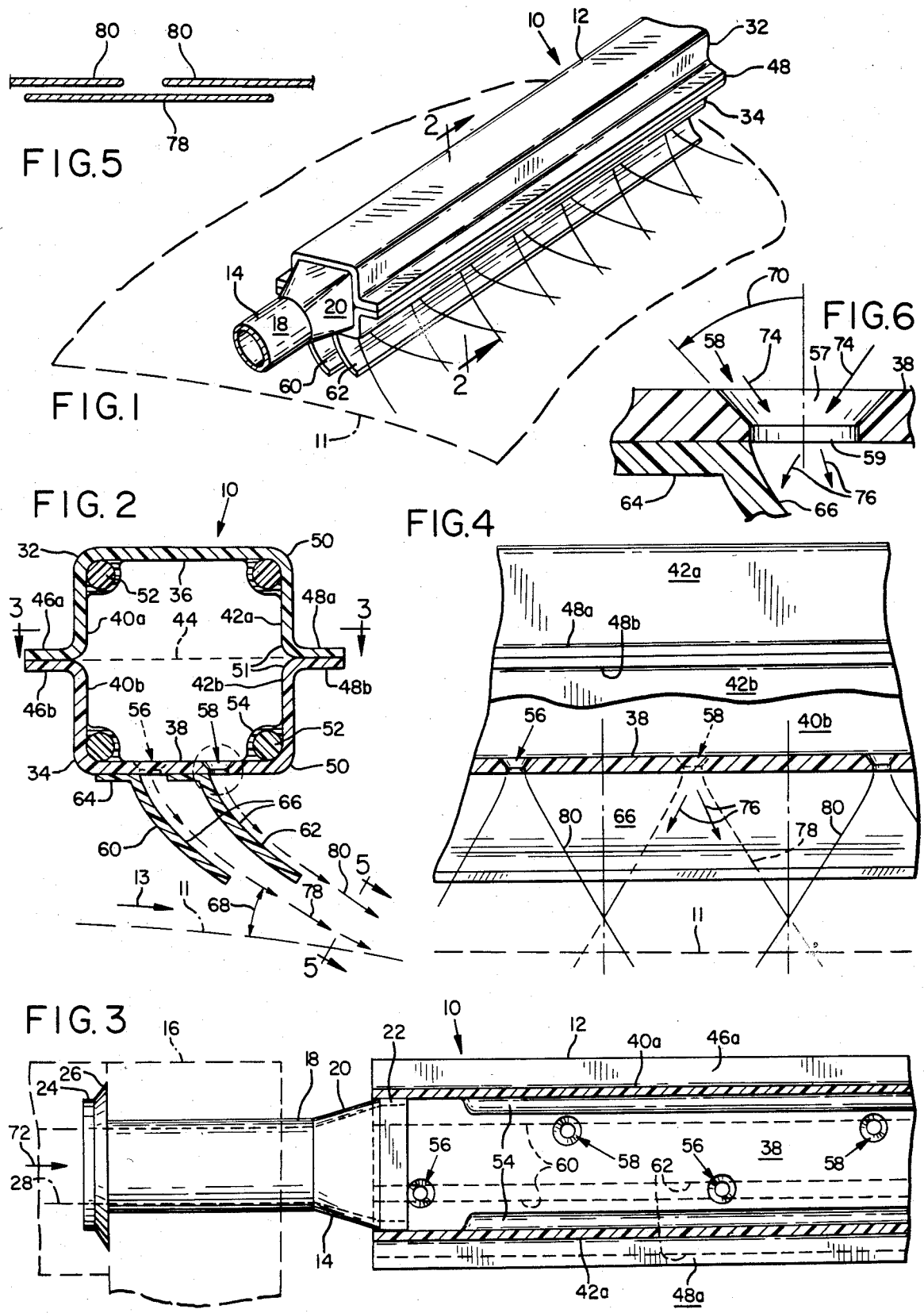

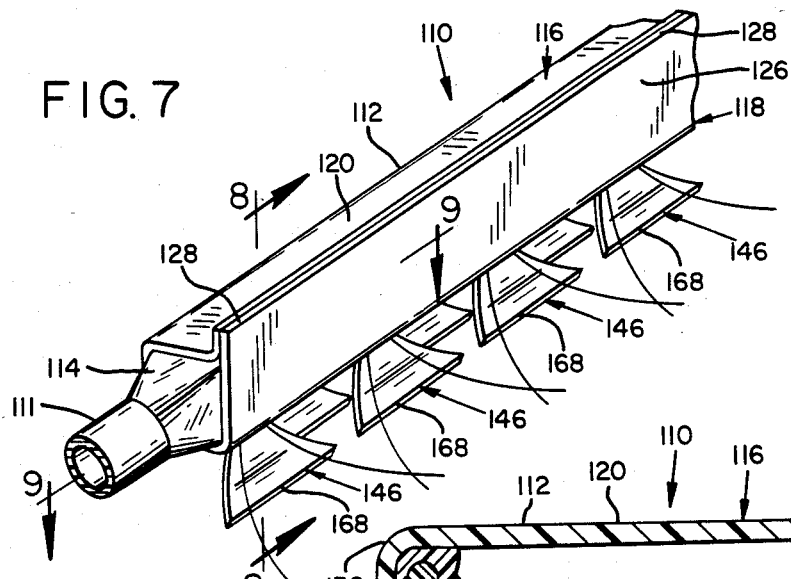
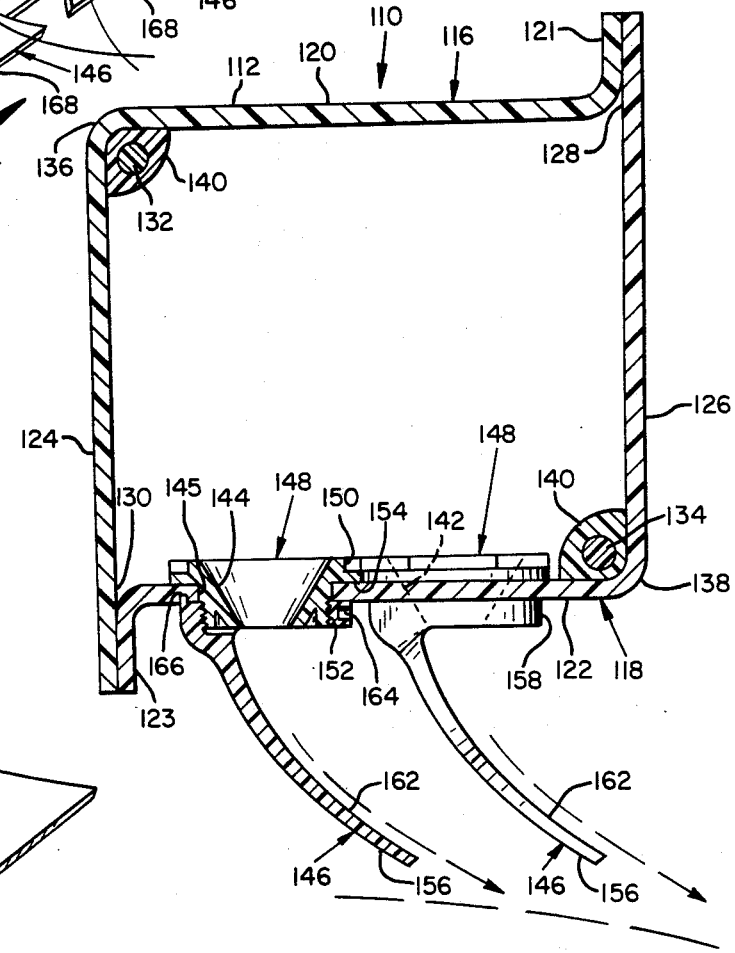
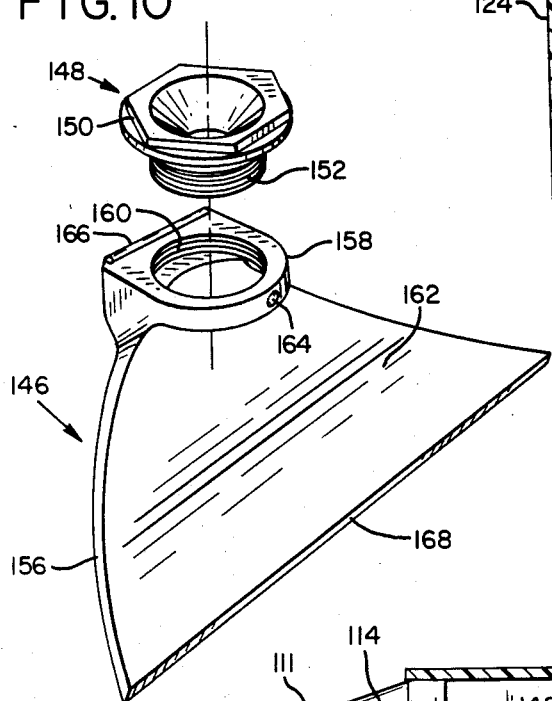
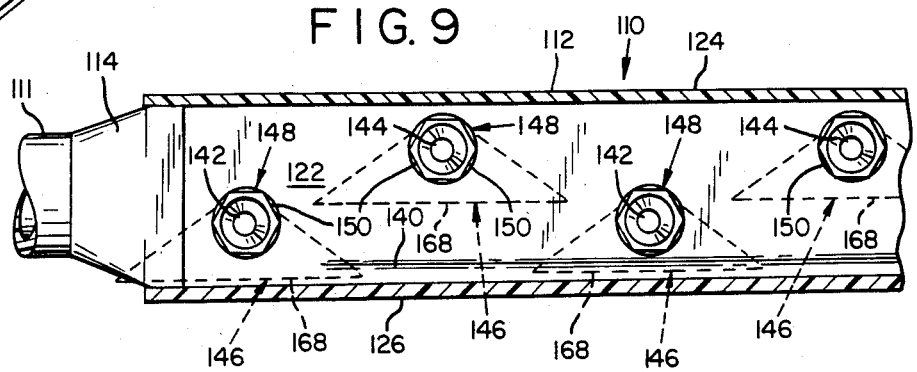

SHOWER PIPES FOR ROTARY DRUM FILTER

RELATED APPLICATION

This application is a continuation of application Ser. No. 709,450, filed Mar. 8, 1985, now abandoned, which is a continuation-in-part of application Ser. No. 464,023, filed Feb. 4, 1983, now U.S. Pat. No. 4,522,716.

BACKGROUND OF THE INVENTION

The present invention relates generally to rotary drum filters and more particularly to shower pipes for such filters.

Rotary drum filters are well known and are commonly used, for example, in the pulp- and paper-making industry for separating wood pulp from pulp slurry. Such filters include a rotary drum partially submerged in a tank of pulp slurry. The drum surface is conventionally covered by a filter screen. As the screen rotates through the pulp slurry, a vacuum is applied within a portion of the drum, collecting a wet mat of fibers from the slurry on the screen. As the screen emerges from the tank, slurry liquid or filtrate is drawn inwardly through the screen by the vacuum and discharged through suitable piping, thereby removing the liquid from the mat. Examples of such filters are disclosed generally in U.S. Pat. No. 4,276,169 to Browne, et al., U.S. Pat. No. 4,248,716 to LaValley, U.S. Pat. No. 4,370,231 to LaValley, and in the patents cited therein.

Conventionally, about half a dozen parallel shower pipes are angularly spaced around a segment of the drum extending from just above the surface of the slurry to the top of the drum, proceeding in the direction of drum rotation. These pipes extend axially of the drum and are supported adjacent the ends of the drum. Washing liquid is discharged in a spray from the shower pipes to wash the pulp fibers as the mat emerges from the slurry. The pipes are spaced a fixed radial distance from the filter screen. This distance is preferably constant along the length of the pipes so that spray intensity and distribution are substantially uniform all the way across the mat. Examples of such shower pipes are disclosed in U.S. Pat. Nos. 3,150,082 to Rich and 3,363,774 to Luthi.

One persistent problem in the design and manufacture of rotary drum filters for use in pulp manufacture is the mitigation of corrosion. This problem has been overcome in part by making as many components of the filters as possible of corrosion-resistant material, such as fiberglass reinforced plastic. However, prior attempts at making shower pipes of fiberglass reinforced plastic have suffered from several drawbacks.

One drawback is a tendency of the pipes to sag. Conventional drum filters are very long, often 20 feet or more. To span the length of the drum, the shower pipes must be even longer. Such pipes are ordinarily supported only at their ends and, during operation, are filled with washing liquid. Consequently, they must be extrmely stiff to minimize sagging between their ends. Prior shower pipes, constructed of fiberglass reinforced plastic alone and having a cylindrical cross section, are not sufficiently stiff to resist sagging.

Therefore, to increase stiffness in the vertical plane, it has been proposed to provide such pipes with a vertical fin or "stiff back" along one side. However, each pipe must be rotationally positioned so that its spray outlets or nozzles direct the spray against the mat at about the same angle of incidence. The rotational position thus varies with the angular position of each pipe around the drum. Applying a stiff back on all pipes in the same position relative to the spray outlets would defeat the purpose of the stiff back in the pipes that are rotationally positioned with stiff back approaching horizontal. Depending on pipe spacing, such positioning might also be precluded by interference between the stiff back of one pipe and an adjacent pipe. Hence, to be effective, this proposal would require making a different configuration pipe for each angular position around the drum.

Various shower pipe designs having steel angle members or stiffeners imbedded in the plastic at angular intervals around the pipe have also been tried, but still sag unacceptably. In one example, a 17 foot long cylindrical shower pipe, reinforced with three steel angle members, exhibited 15/32" sag when supporting a static load of 100 pounds midway between its ends. This is more sag than can be tolerated. Moreover, as this design of pipe is heated by the washing liquid, the steel stiffeners and fiberglass reinforced plastic expand differently, increasing both sag and the risk of cracking of the plastic or internal separation of the plastic and stiffeners due to thermal fatigue.

Another problem involves the spray pattern of washing liquid discharged from the shower pipes. It is desirable to wash the mat uniformly, necessitating continuous or overlapping spray coverage along the axial length of the drum. However, since the mat is typically thin and fragile, care must be taken to avoid tearing it with excessive localized spray intensity. Accordingly, a variety of different spraying arrangements have been proposed. One such arrangement uses a single row of spray holes spaced along the length of the pipe, together with some means for diffusing the spray from each hole to provide overlapping coverage. One form of diffusing means is a continuous lip or flange positioned along the row of holes and extending outwardly from the pipe to cause the spray from each hole to fan out. This approach is unsatisfactory because it concentrates too much spray pressure where overlapping adjacent fans of spray both strike the mat, often tearing the mat. Other forms of diffusing means include a whistle-type nozzle and a spoon-type diffuser positioned alongside each spray outlet. The latter forms of spray diffusers have also been tried in conjunction with double rows of longitudinally staggered holes. However, in practice, they do not provide sufficiently uniform spray coverage and are susceptible to plugging by fiber backspattered from the mat into the spray outlets by the spray.

An additional disadvantage is the difficulty of making the foregoing shower pipe designs of fiberglass reinforced plastic using conventional manufacturing techniques. Heretofore, fiberglass reinforced plastic washer pipes have been formed on a cylindrical mandrel. Once a cylindrical pipe is formed, steel stiffeners are applied to its outer surface and overlain with additional fiberglass reinforced plastic material. Next, cylindrical spray holes are drilled in a row along a side of the pipe. Finally, a diffuser flange is positioned along the row of holes and secured to the pipe. This process produces a pipe having a rough and uneven outer surface. Such a surface precludes accurate positioning of the diffuser flange relative to the row of holes, thereby causing uneven diffusion of the spray. This process also renders virtually impossible the formation of complex shapes of spray holes or nozzles. And the resultant product has the functional drawbacks described above, namely, sagging and tearing the mat.

Many of the foregoing problems are eliminated by the shower pipe of the afore-mentioned copending U.S. application Ser. No. 464,023. Such shower pipe is made of fiberglass reinforced plastic and has a rectangular cross-section providing substantial rigidity against sagging between the ends of the pipe regardless of the rotational orientation of the pipe along a rotary drum filter. The pipe is stiffened by a pair of structural connecting flanges which extend along opposite sides of the pipe and provide rigidity to prevent the pipe from sagging. The pipe also includes reinforcing rods which extend along the interior corners of the pipe, also to provide rigidity against sagging.

Such pipes are preferably formed by molding them in channel-shaped half-sections which are subsequently joined together along their connecting flanges. Spray holes are machined in one of the half sections in two parallel rows in which the holes of one row are staggered from the holes of the other row. Continuous diffusion members extend along each row so as to diffuse the discharges of liquid from each row of holes into two different planes. In this way, overlapping spray coverage is obtained without any overconcentration of spray at any point on the mat. The spray holes have a constricting frustoconical shape to better diffuse or decolumnate the discharge of liquid onto the diffusion members.

Although the shower pipe of application Ser. No. 464,023 is a great improvement over known prior shower pipes, its integral essentially all fiberglass construction is laborious and expensive to manufacture, and requires laborious machining of each spray hole. Furthermore, while the continuous diffusion flanges along each row of spray holes are an improvement over prior hole-diffuser arrangements, the diffusion pattern they produce leaves room for more improvement.

Accordingly, there remains a need for a shower pipe which has the improved features of the pipe disclosed in application Ser. No. 464,023 but which is easier and less expensive to manufacture and has an improved spray diffusion pattern.

Therefore, a first object of the invention is to provide an improved shower pipe for rotary drum filters.

A second object of the invention is to provide an improved method of making such shower pipes.

A third object of the invention is to provide a shower pipe having an improved spray diffusion pattern to efficiently and effectively wash a mat without damaging it.

A fourth object is to provide an improved fiberglass reinforced plastic shower pipe which resists sag regardless of its rotational orientation and throughout its operational temperature range.

A fifth object is to provide a fiberglass reinforced plastic shower pipe which is easier and less expensive to manufacture than previous designs.

A sixth object is to provide an improved spray diffusion flange for a shower pipe.

A seventh object is to provide an improved method of providing spray holes and flanges on shower pipes.

SUMMARY OF THE INVENTION

In accordance with the invention, the foregoing objects are realized in a shower pipe comprising a rigid elongate pipe made of fiberglass-reinforced plastic. A first row of spray holes extends in spaced apart relationship axially along the pipe, the holes extending through an outer wall of the pipe for discharging a first liquid spray line along the length of the pipe when it is filled with a liquid under pressure. A second row of spray holes extends in spaced apart relationship parallel to the first row, the second row being in the same quadrant of the pipe as the first row for discharging a second liquid spray line along the length of the pipe close to the first spray line. The holes of the second row are axially spaced between the holes of the first row so that the holes of the two rows are staggered axially along the pipe.

Each spray hole of each row has its own separate fan-shaped diffusion flange extending in a generally parabolic curve from adjacent the hole.

Each diffusion flange in a row can be spaced axially of the adjacent diffusion flanges of the same row such that the sprays dispersed by each flange are in a parallel flow plane and do not meet before impinging a mat on the drum filter. Furthermore, each of the fan-shaped flanges can generally widen from a narrow end at the spray hole to a wide free end. The wide free end edge defines a straight free end edge to disperse spray from the flange, substantially in a parallel flow plane. The flange includes an upper spray diffusion surface concavely curved in a direction form its narrow end toward its free end.

Each spray hole may be formed by a premolded plastic sleeve-like insert which is inserted through and seated within prebored holes in a section of the pipe. Each insert defines a spray hole or nozzle for discharging liquid under pressure from the pipe onto its associated diffusion flange.

Each diffusion flange may be premolded to mate with the afore-mentioned spray hole insert. For this purpose, the flange member may include a female threaded upper portion which threads onto a male threaded projecting portion of the insert extending from the outer wall of the pipe.

According to one method of the invention, the pipe may be fabricated in two channel-shaped half sections bonded together along flanges to define a pipe of rectangular section with structural rigidifying flanges extending along opposite sides.

According to an alternative method of the invention, the pipe may be fabricated in two angle-shaped half sections bonded together along flanges also to define a pipe of rectangular section, but with structural rigidifying flanges at diagonally opposite corners.

The foregoing and other objects, features and advantages of the invention will become more readily apparent from the following detailed description which proceeds with reference to the accompanying drawing.

BRIEF DESCRIPTION OF DRAWINGS

FIG. 1 is a top perspective view of one end of a shower pipe of the parent application in position for washing a mat of fibrous pulp material carried on the screen of a rotary drum filter, the drum structure being omitted for clarity;

FIG. 2 is a cross-sectional view taken along lines 2—2 in FIG. 1;

FIG. 3 is a transverse sectional view taken along lines 3—3 in FIG. 2;

FIG. 4 is a front elevational view of the shower pipe of FIG. 1 with a lower portion of the pipe cut away along the front row of holes;

FIG. 5 is a view taken along lines 5—5 in FIG. 4, showing the spray distribution formed by the shower pipe just before the spray strikes the mat;

FIG. 6 is an enlargement of the circled portion of the view of FIG. 2 showing details of the spray hole and flange portion;

FIG. 7 is a perspective view of an improved and preferred embodiment of shower pipe in accordance with the invention;

FIG. 8 is a cross-sectional view taken along lines 8—8 in FIG. 7;

FIG. 9 is a vertical cross-sectional view taken along lines 9—9 in FIG. 7; and

FIG. 10 is a perspective exploded view of the diffusion flange and spray hole insert assembly portion of the shower pipe shown assembled in FIG. 8.

DETAILED DESCRIPTION

Embodiment of FIGS. 1–6

Referring to FIG. 1, shower pipe 10 comprises an elongated, square conduit or body 12 terminated at each end by a square-to-round reducer pipe 14. Referring to FIG. 3, shower pipe 10 is supported at each end by a bracket 16 structured to receive the cylindrical portion 18 of reducer 14. Bracket 16 is conventionally arranged to position pipe 10 a fixed distance from mat 11, which is borne by the rotary drum (not shown) in a direction indicated in FIG. 2 by arrow 13. Connecting the cylindrical portion 18 of the reducer to the body of the shower pipe is a flared, square section 20, having a parallel-sided, square end portion 22 received within the end of body 12. A sealing flange 24 and backing ring 26 provide a sealed connection between the cylindrical end of the reducer pipe and a washing liquid input conduit 28.

Referring to FIG. 2, the body of shower pipe 10 is formed in upper and lower half sections 32, 34. The assembled body 12 has a square cross section defined by top and bottom walls 36, 38 and sidewalls 40, 42. Top wall 36 and upper portions 40a, 42a of the sidewalls are formed in the upper section 32. Bottom wall 38 and lower portions 40b, 42b of the sidewalls are formed in the lower section 34.

In terms of overall configuration, the upper and lower sections 32, 34 are mirror images, shaped to mate together along a dividing plane 44 parallel to and spaced equidistantly between top wall 36 and bottom wall 38. The sections are connected together along such plane by parallel interconnection flanges 46, 48, which extend outwardly at right angles from sidewalls 40, 42 along the length of the pipe body. The walls of the upper and lower sections meet at generally rounded right angle corners, such as corners 50. Similarly, flanges 46, 48 are integrally connected to their respective sidewalls at roundd right angle corners 51. A reinforcing rod 52 is positioned inside the shower pipe within the interior of each corner 50 and secured therein by fiberglass reinforced plastic material 54.

A spray discharge system is formed in the bottom wall 38 of shower pipe body 12. This system includes two rows of outlet or spray holes 56, 58. These holes are closely spaced laterally of the pipe, as shown in FIG. 2. Referring to FIGS. 3 and 4, the holes of each row are spaced longitudinally apart, for example, 16 inches apart in each row. The holes are longitudinally staggered so that the holes in one row are positioned half way between the holes of the other row, so that, e.g., there are holes spaced 8" apart along the length of the pipe. Referring to FIG. 6, the holes themselves have a funnel shape defined by a frustoconical upper portion 57 and a cylindrical lower portion 59.

Depending from the underside of bottom wall 38 are a pair of diffusion flanges 60, 62. These flanges are substantially identical in shape. Each flange has a flat base portion 64 providing a flat surface for mounting the flange on the flat underside of the pipe. The base portion of each flange forms a dogleg with the diffusion portion of the flange. The diffusion portion of each flange has a parabolic concavely-curved diffusion surface 66 extending generally downwardly and across each row of holes 56, 58. In cross section, as best seen in FIG. 6, surface 66 is parallel to spray hole portion 59 immediately adjacent the spray holes, is gently curved proceeding away from such holes, and gradually approaches a straight line at its end portion remote from such holes. Referring to FIG. 3, flanges 60,62 are laterally aligned with the spray holes 56,58 so as to position surfaces 66 tangential to the circumference of the cylindrical outlet portion 59 of the outlet holes. The flanges 60, 62 extend continuously along the entire length of the shower pipe body 12.

Method of Fabrication

Shower pipe 10 is preferably made of molded fiberglass reinforced plastic. Each section 32, 34 of the shower body is separately formed in a trough-like mold (not shown) contoured to mold the outer surface of each section in a generally rectangular configuration with rounded corners 50, 51 at the intersections of the sidewalls and the flanges. The fiberglass reinforced plastic material is manually applied to the mold to a thickness suitable to provide structural strength commensurate with the overall dimensions of the shower pipe. In one example, the shower pipe has external cross-sectional dimensions of 6 inches × 6 inches and the walls are ¼ inch thick. The plastic resins and fiberglass materials used in fabricating sections 32, 34 are known in the art. Flanges 60, 62 are molded in similar fashion, with diffusing surfaces 66 being molded surfaces.

A continuous glass strand or rod 52 is next positioned in each interior corner 50 of each section 32, 34. Fiberglass reinforced plastic material 54 is laid on over the glass rod to secure it to the interior surfaces of the walls of the shower pipe body. In the foregoing example, rods 52 have a diameter of ⅜ inch.

Next, spray holes 56, 58 are formed in the bottom wall 38 of lower section 34. Such holes are formed by drilling, using a suitable template, from the inner or upwardly-facing side of wall 38 toward the outer or lower side thereof. First, a pilot hole is drilled using a straight-sided bit of the diameter of portion 59. Then, a conical bit is used to form portion 57 concentrically with portion 59. The angle of the conical portion of the holes, indicated by arrow 70, is preferably about 41°. In the foregoing example, the rows of holes are laterally spaced, center to center, 1⅝ inches apart and the holes in each row are 16 inches apart. The holes have a minimum diameter in cylindrical portion 59 of one half inch.

The next step is to assemble upper and lower sections 32, 34 and to apply flanges 60, 62 to the underside of wall 38, adjacent rows of holes 56, 58, respectively. The sections are joined along flanges 46, 48 using conventional putty material. Diffusion flanges 60, 62 are connected to bottom wall 38, continuously along its length, in like fashion. With the shower body assembled, square-to-round reducer 14 is inserted in each end of the shower body and secured therein.

Operation

Shower pipe 10 is next installed on a rotary drum filter by mounting its ends in bracket 16 and connecting it to conduit 28. Those skilled in the art will readily appreciate that a plurality of such pipes will be angularly spaced around a quadrant of the drum. Each pipe is connected to a liquid input manifold, of which conduit 28 forms a single branch. Each pipe is rotationally positioned in its respective bracket 16 to discharge a spray at a selected angle 68 from the mat 11. Thus, pipe 10 is rotationally positioned as shown in FIGS. 1 and 2, for use at the top or 12 o'clock position on the drum. In that position, diffusion flanges 66 assist side walls 40,42 in stiffening the pipe to resist sagging. Another such pipe located near the 9 o'clock position on the drum would be rotated counterclockwise nearly 90° from the position shown in FIG. 2. In the latter position, flanges 46, 48 are oriented nearly vertically to assist top and bottom walls 36,38 in stiffening the pipe against sagging. In pipes located at intermediate positions, for example, the 10:30 position, the interconnection flanges and the glass strands nearest to vertical alignment jointly stiffen the pipe. The foregoing example of shower pipe 10, in a length of 20 feet, supports a 400 pound load at its center with only ⅛ inch deflection or sag. Also, when operated within the normal range of thermal conditions, deflection or sag does not vary measurably.

In operation, washing fluid is introduced into the shower pipe through conduit 28, as indicated by arrow 72. This liquid is discharged under pressure through holes 56, 58. The funnel shape of the holes tends to accelerate the velocity of fluid discharge to a maximum at cylindrical outlet portion 59. This shape also causes the water to flow diagonally, as well as vertically downwardly, toward the narrowest part of the discharge opening, as indicated by arrows 74 in FIG. 6. The vertical dimension of cylindrical portion 59 is small, for example, 1/32 to 1/16 inch, relative to its diameter, and so does not tend to appreciably collimate the discharge flow of liquid. As a result, the foregoing hole configuration provides a slightly divergent discharge flow, as indicated by arrows 76 in FIGS. 4 and 6.

The discharge flow further diffuses laterally as it flows down surface 66, to form generally fan-shaped flow patterns 78, 80. The combined action of the configuration of discharge holes, the parabolic shape of the diffusing surfaces, and the positioning of such surfaces immediately adjacent the holes, widely and uniformly disperses the discharge flows 78, 80 from such holes, as best seen in FIG. 5. The sprays from adjacent holes in the same row overlap much of the offset spray from a hole between them in the other row, but do not themselves overlap. In one example, with the discharge holes in each row spaced 16 inches apart, or a staggered spacing of 8 inches, the width of each fan pattern 78, 80 just above the mat 11 is 12-14 inches. In comparable prior shower pipes, the fan patterns are typically about 8 inches wide.

Embodiment of FIGS. 7-10

An improved version of the previously described shower pipe is shown in FIGS. 7-10. Referring to FIG. 7, a shower pipe 110 comprises an elongated conduit 112 of square cross section terminating at each end at a square-to-round reducer pipe 114. Two rows of diffusion lips or flanges 146 extend from the underside of pipe 110.

Referring to FIG. 8, shower pipe 110 is formed of upper and lower angle-shaped half sections 116 and 118. The assembled sections include top and bottom walls 120, 122, and side walls 124, 126. Top wall 120 and side wall 124 form the upper section 116. Top wall 120 includes a right angle connecting flange 121. Bottom wall 122 and side wall 126 form the lower section 118. Bottom wall 122 includes right angle connecting flange 123. It will be apparent that upper and lower sections 116, 118 are actually identical in shape. Upper and lower sections 116, 118 are connected together by bonding flange 121 of the upper section to side wall 126 of the lower section and flange 123 of the lower section to side wall 124 of the upper section. This forms a pipe of square cross section with rigidifying flange means at diagonally opposite corners 128, 130. Reinforcing rods 132 and 134 of steel or glass are embedded in resin 140 within diagonally opposite interior corners 136 and 138 not occupied by flanges 121, 123.

A spray discharge system is included in the bottom wall 122 of lower pipe section 118. The system includes two horizontal rows of frustoconical spray holes 142 and 144. These rows are closely spaced laterally of the pipe, as shown in FIG. 8.

Referring to FIG. 9, the spray holes of each row are spaced longitudinally apart, for example, sixteen inches apart in each row. The holes are longitudinally staggered so that the holes in one row are positioned half way between the holes of the other row so that in the above example there are holes spaced eight inches apart along the length of the pipe. Depending from each adjacent hole is a separate diffusion lip or flange 146.

As shown in FIGS. 8 and 10, the frustoconical spray holes and associated diffusion flanges are formed as separate preformed injection-molded plastic members 148, 146 which are assembled together at corresponding straight-bored holes 145 through bottom wall 122 of the lower pipe section before the two pipe sections are joined together. Member 148 is a hollow insert nut which includes an enlarged hex head 150 joined to an externally threaded shank 152 to define a shoulder 154 which seats against the inside surface of bottom wall 122 when the shank extends through hole 145. The bore of the insert defines the frustoconical spray holes 144, 142.

Diffusion flange member 146 includes the fan-shaped lip 156 terminating at its upper end in an integral connecting ring 158 having internal threads 160 for threading on shank 152 of insert 148. Like the continuous lips of the first embodiment, the diffusion lips 156 have diffusion surfaces 162 which are concavely curved, and preferably parabolically curved, from their meeting with the lower bore walls of their respective spray holes. The connecting ring 158 includes a sonic welding port 164 for receiving the tip of a sonic welding tool for fusing together the threads of the insert and flange after their assembly. Ring 158 also includes an upwardly extending rear bead 166 which is inserted into a corresponding groove in the bottom surface of lower pipe wall 122 to ensure proper alignment of the diffusion lips when assembled.

The pronounced fan shape of diffusion lips 156 provide a desired lateral dispersion of spray from the associated spray hole. The spread of the fan should be such that good lateral dispersion of spray is achieved without any overlapping of spray from adjacent spray holes in the same row. The lips terminate in a wide straight free end edge 168 which projects the spray from the lip substantially in a plane.

Method of Construction

The pipe of FIGS. 7-10 is made as follows:

The two identical fiberglass reinforced plastic pipe sections 116, 118 are laid up in an appropriately shaped mold. Straight holes 145 at the required spacing are then bored through bottom wall 122 of the lower section. Then at each hole 145, a diffusion flange is positioned with its bead 166 in a bottom groove of the bottom wall. Insert nut 148 is then inserted through the straight hole 145 and threaded into the ring of the flange member, using a wrenching tool applied to the hex head 150 to torque the flange and insert assembly tightly together with a portion of the bottom wall 122 sandwiched therebetween. When all lips are axially aligned, the flanges 146 are sonically welded to inserts 148 by inserting the sonic welder in sockets 164 to fuse their mating threads.

When all inserts and flanges have been assembled on the bottom wall 122 and reinforcing rods 132, 134 installed as previously described, the upper and lower pipe sections are bonded together with the connecting flanges 121, 123 of such sections in lapped abutment against the side walls 126, 124, respectively of such sections, using well known fiberglass bonding techniques.

The resulting shower pipe is reinforced at all corners, in two opposed corners by the flanges 121 and 123 and lapped side wall portions, and in the other two corners by rods 132, 134. The pipe thus resists sagging regardless of orientation when in use, and only requires two reinforcing rods rather than the four used in the first embodiment.

The resulting shower pipe is also faster and easier to make than the pipe of the first embodiment because of its use of prefabricated diffusion flanges and spray hole inserts. This eliminates the need for machining the spray holes into the pipe blank and the need for molding fiberglass diffusion flanges and then bonding them to the pipe section. It also eliminates the need for machining the continuous diffusion flanges to produce a separate flange for each spray hole as previously required.

Having illustrated and described the principles of my invention in a preferred embodiment, it should be readily apparent to those skilled in the art that the invention can be modified in arrangement and detail without departing from such principles. I claim all such modifications as come within the spirit and scope of the following claims.

I claim:

1. A rotary drum filter comprising:
   a shower pipe spanning the length of said filter drum;
   means defining first and second parallel rows of spray holes extending along the length of said pipe, the holes in one row being staggered with respect to the holes in the other row, both rows being positioned circumferentially in the same quadrant of the pipe;
   a separate fan-shaped spray diffusion flange projecting from said pipe adjacent each spray hole; and
   each diffusion flange in a row being spaced axially of the adjacent diffusion flange of said same row such that the sprays dispersed by each flange do not meet before impinging a mat on said drum filter.

2. A shower pipe according to claim 1 wherein each said flange includes a concavely curved spray diffusion surface.

3. A shower pipe according to claim 1 wherein each flange includes a concave, substantially parabolically curved spray diffusion surface.

4. A shower pipe according to claim 1 wherein each flange is threadedly connected to said pipe.

5. A shower pipe according to claim 1 wherein said means defining said first and second rows of spray holes includes a plurality of insert members inserted into through openings in said pipe, each insert member including a bore defining one of said spray holes.

6. A shower pipe according to claim 5 wherein each insert member includes a threaded shank portion extending through a said opening and each flange includes a threaded ring portion for threading to said shank portion to connect said insert member and flange together and to said pipe.

7. A shower pipe according to claim 1 wherein said pipe has a square cross section throughout substantially its entire length.

8. The rotaty drum filter of claim 1, wherein said shower pipe is rigid.

9. A rotary drum filter, comprising:
   a shower pipe spanning the length of said drum filter having at least one row of spray holes extending along its length and a separate spray diffusion flange means extending from the pipe adjacent each spray hole,
   each diffusion flange means including a spray hole defined by an internal bore of an insert member inserted and retained within a through opening of said pipe, said insert member including an enlarged head portion and a shoulder for seating against a first surface of the pipe and an externally threaded shank for insertion through said opening to project beyond a second surface of the pipe opposing the first surface; and
   each flange means also including a diffusion lip portion and an internally threaded ring means for threading onto said shank to connect said insert member and diffusion lip portion to said pipe.

10. In a shower pipe according to claim 9, the enlarged head portion of said insert member including a hex head for receiving a torquing tool.

11. In a shower pipe according to claim 9, said internal bore having a frustoconical shape.

12. In a shower pipe according to claim 9, each diffusion flange means including an upwardly projecting bead for seating within a corresponding groove of the pipe to orient the diffusion lip portion for desired spray dispersal.

13. In a shower pipe according to claim 9, the lip portion having a fan shape for lateral spray dispersion and a concave spray diffusion surface.

14. In a shower pipe according to claim 13, the diffusion surface being parabolically curved.

15. A shower pipe for a rotary drum filter comprising:
   a rigid elongate pipe having a rectangular cross section for spanning the length of a filter drum, the pipe being made of fiberglass reinforced plastic and including a row of spray holes and associated spray diffusion flange means extending along its length;
   a pair of external structural flange means extending continuously lengthwise of the pipe and in opposite directions from diagonally opposing first and second corners of the pipe, the flange means being parallel to a pair of pipe walls and to each other, for stiffening the pipe to resist sagging;

and a pair of axially-extending continuous reinforcing members secured within diagonally opposing third and fourth corners of the pipe for stiffening the pipe to resist sagging.

16. A shower pipe according to claim 15 wherein said pipe comprises a pair of similar angle-shaped pipe half sections each including a pair of walls meeting at right angles, one wall of each section including a right-angle flange, the other wall of each section being flangeless, the right-angle flange of each section being bonded to the flangeless wall of the other section to define said flange means and form said rectangular cross section.

17. A shower pipe according to claim 16 wherein one wall of said section includes two parallel rows of said spray holes, each row including a separate diffusion flange means.

18. A shower pipe according to claim 17 wherein said flange means includes a separate diffusion flange for each hole.

19. A shower pipe for a rotary drum filter comprising:
a length of fiberglass-reinforced plastic pipe;
said pipe being composed of four walls defining a rectangular cross section;
means defining two parallel rows of spray holes extending lengthwise of the pipe through one of said walls, the holes of one row being staggered from the holes of the other row along the pipe length; a separate spray diffusion flange affixed to the pipe adjacent each spray hole, each flange being generally fan-shaped to disperse spray laterally from its associated spray hole, each flange terminating in a straight free end edge to disperse spray substantially in a plane, and each flange including an upper spray diffusion surface concavely curved in a direction from the spray hole toward the free end edge.

20. A rotary drum filter comprising:
a shower pipe spanning the length of the drum filter;
means defining a row of spray holes extending through said pipe along the length of the pipe;
a separate spray diffusion flange extending from the pipe adjacent each spray hole; and
each flange being generally flange-shaped, widening from a narrow end at the spray hole to a wide free end, said free end defining a straight free end edge to disperse spray from the flange substantially in a plane, said flange including an upper spray diffusion surface concavely curved in a direction from its narrow end towards its free end.

21. A shower pipe according to claim 20 wherein said flange at its narrow end includes an internally threaded ring portion for threading onto a matingly threaded portion of said pipe.

22. A rotary drum filter comprising:
a shower pipe spanning the length of the drum filter;
means defining a row of spray holes extending through said pipe along its length;
a separate spray diffusion flange means for extending from the pipe adjacent each spray hole;
and attachment means for threadedly attaching each flange means to the pipe, said attachment means including first threaded attachment means outside the pipe and second threaded attachment means inside the pipe for cooperative threaded engagement with each other through the adjacent spray hole.

23. A shower pipe according to claim 22 wherein the first and second attachment means are annular and one said means defines the inner diameter of the spray hole.

24. A shower pipe according to claim 22 wherein one of said first and second attachment means is integral with said diffusion flange means.

25. A shower pipe for a rotary drum filter comprising:
a length of pipe for spanning the length of a filter drum, said pipe having a square cross section and comprising a fiberglass reinforced plastic conduit with external reinforcing flanges extending continuously through its length;
means defining first and second parallel rows of spray holes extending along the length of said pipe, the holes in one row being staggered with respect to the holes in the other row, both rows being positioned circumferentially in the same quadrant of the pipe;
a separate fan-shaped spray diffusing flange projecting from said pipe adjacent each spray hole; and
each diffusion flange in a row being spaced axially of the adjacent diffusion flanges of said same row such that the sprays dispersed by each said flange do not meet before impinging a mat on said drum filter.

26. A rotary drum filter including a shower pipe comprising:
a length of pipe for spanning the length of said filter drum;
means defining first and second parallel rows of spray holes extending along the length of said pipe, the holes in one row being staggered with respect to the holes in the other row, both rows being positioned cicumferentially in the same quadrant of the pipe;
a separate fan-shaped spray diffusion flange projecting from said pipe adjacent each spray hole; and
each diffusion flange in a row being spaced axially of the adjacent diffusion flanges of said same row such that the sprays dispersed by each said flange are in a parallel flow plane and do not meet before impinging a mat on said drum filter.

27. A rotary drum filter including a shower pipe comprising:
a length of pipe for spanning the length of the drum filter;
means defining a row of spray holes extending through said pipe along the length of the pipe;
a separate spray diffusion flange extending from the pipe adjacent each spray hole; and
each flange being generally fan-shaped, widening from a narrow end at the spray hole to a wide free end, said free end defining a straight free end edge to disperse spray from the flange substantially in a parallel flow plane, said flange including an upper spray diffusion surface concavely curved in a direction from its narrow end towards its free end.

28. A rotary drum filter including a shower pipe comprising:
a length of pipe for spanning the length of said filter drum;
means defining first and second parallel rows of spray hoels extending along the length of said pipe, the holes in one row being staggered with respect to the holes in the other row, both rows being positioned circumferentially in the same quadrant of the pipe;

a separate fan-shaped spray diffusion flange projecting from said pipe adjacent each spray hole; and each diffusion flange in a row being spaced axially of the adjacent diffusion flanges of said same row such that the sprays dispersed by each said flange do not meet before impinging a mat on said drum filter, said pipe and each said flange being made of fiber-reinforced plastic.

29. A rotary drum filter including a shower pipe comprising:

a length of pipe for spanning the length of the drum filter;

means defining a row of spray holes extending through said pipe along the length of the pipe;

a separate spray diffusion flange extending from the pipe adjacent each spray hole; and each flange being generally fan-shaped, widening from a narrow end at the spay hole to a wide free end, said free end defining a straight free end edge to disperse spray from the flange substantially in a plane, said flange including an upper spray diffusion surface concavely curved in a direction from its narrow end towards its free end, said pipe and each said flange being made of fiber-reinforced plastic.

30. A rotary drum filter including a shower pipe comprising:

a length of pipe for spanning the length of the drum filter;

means defining a row of spray holes extending through said pipe along its length;

a separate spray diffusion flange means for extending from the pipe adjacent each spray hole;

and attachment means for threadebly attaching each flange means to the pipe, said attachment means including first threaded attachment means outside the pipe and second threaded attachment means inside the pipe for cooperative threaded engagement with each other through the adjacent spray hole, said pipe and each said flange being made of fiber-reinforced plastic.

* * * * *